United States Patent [19]

Otake et al.

[11] E Re. 30,659

[45] Reissued Jun. 30, 1981

[54] PEN POINTS FOR WRITING INSTRUMENTS

[75] Inventors: Nobuyuki Otake, Tokyo; Kozo Ando, Chiba; Hironobu Hori, Higashi-Kana; Ykinori Sato, Tokyo, all of Japan

[73] Assignee: Tokyo Boshi Kabushiki Kaisha, Japan

[21] Appl. No.: 123,508

[22] Filed: Feb. 22, 1980

Related U.S. Patent Documents

Reissue of:

[64] Patent No.: 4,076,428
Issued: Feb. 28, 1978
Appl. No.: 684,677
Filed: May 10, 1976

[30] Foreign Application Priority Data

May 15, 1975 [JP] Japan ..... 50-56693

[51] Int. Cl.[3] ..... B43K 7/00; B43K 1/06

[52] U.S. Cl. ..... 401/209; 401/265; 401/292

[58] Field of Search ..... 401/265, 199, 292, 198, 401/258

[56] References Cited

U.S. PATENT DOCUMENTS

| | | | |
|---|---|---|---|
| 3,510,227 | 5/1970 | Horie et al. | 401/199 |
| 3,520,629 | 7/1970 | Otsuka | 401/199 |
| 3,572,954 | 3/1971 | Cheron | 401/18 |
| 3,614,247 | 10/1971 | Otsuka | 401/199 |
| 3,617,325 | 11/1971 | Spokes et al. | 401/198 |
| 3,718,401 | 2/1973 | Kiriu | 401/199 |
| 3,778,495 | 12/1973 | Woolley | 264/177 F |
| 3,830,576 | 8/1974 | Kohno et al. | 401/292 |
| 3,932,044 | 1/1976 | Otake et al. | 401/292 X |
| 3,945,869 | 3/1976 | Miller | 401/198 |
| 3,969,027 | 7/1976 | Randar | 401/199 |
| 4,072,430 | 2/1978 | Otsuka | 401/265 |

FOREIGN PATENT DOCUMENTS

| | | | |
|---|---|---|---|
| 1485772 | 5/1967 | France | 401/199 |
| 451130 | 1/1970 | Japan | 401/199 |
| 1317312 | 5/1973 | United Kingdom | 401/199 |

*Primary Examiner*—Stephen C. Pellegrino
*Attorney, Agent, or Firm*—Maky, Renner, Otto & Boisselle

[57] ABSTRACT

Pen point for writing instruments which is a rod-shaped wick composed of synthetic resin filaments and in which narrow slots defined by said filaments extend longitudinally in said wick and form ink passageways, comprising in the cross-section (a) a circular portion to form the outer periphery portion of the pen point, (b) a plurality of stem portions projecting inwardly from the inner periphery portion of said circular portion and being arranged at a moderate distance with one another, (c) branches projecting laterally from at least two stem portions, said stem portions and branch portions being constituted with a plurality of connected monofilaments, each having same or different diameter, (d) standing tree-formed projections consisting of said stem portions and said branch portions, which are arranged in a fold axis symmetry against the center of the pen point, and (e) the above described projections being mutually crossed or the above described projections and the above described stem portions are crossed to form narrow slots for conveying ink.

31 Claims, 21 Drawing Figures

PEN POINTS FOR WRITING INSTRUMENTS

Matter enclosed in heavy brackets [ ] appears in the original patent but forms no part of this reissue specification; matter printed in italics indicates the additions made by reissue.

The present invention relates to synthetic resin nibs or writing elements (referred to as pen points hereinafter) to be used for writing instruments, such as marking pen, sign pen, ball point pen for liquid ink and the like.

As well known, these pen points for these writing instruments have fine bores of various cross-sectional shapes in the interior and by the capillary function of these fine bores, ink is absorbed in the pen point and ink is supplied from the interior of the pen point upon writing. As such pen points for the writing instruments, those which are produced by grinding at least one end of the rod-shaped wick composed of synthetic resin filaments so as to suit to a writing nib, have been heretofore broadly used as a pen point for fine writing. Furthermore, there is one which is used as an element for conveying ink by inserting one end of the rod-shaped wick in an inner hole of a ball supporter in a ball point pen and connecting the other end to an ink reservoir to cause the capillary function.

These pen points have been always improved with respect to the ink passage property or the properties, such as friction resistance and elasticity relating to particularly the writing feeling at the writing tip of the pen point of the writing instrument but in order to adapt the pen points to broad uses respectively, a large number of trial and error tests have been repeated and a waste time has been spent for the design and production.

A main object of the present invention is to propose a variety of advantageous pen point structures through the same planning idea and to provide the pen points capable of easily obtaining the optimum writing properties depending upon the use of the writing instruments.

The present invention is an improvement of U.S. Pat. No. 3,932,044 filed on Nov. 29, 1974 by the same applicant.

The production of the pen points according to the present invention can be attained by means of the already known die provided with extrusion orifices, through which the molten synthetic resin is spun into filaments which are united by cooling.

In particular, an object of the present invention is to provide such improved pen points that the total length of the wall of the narrow slots forming the capillaries formed on the cross-section of the pen point is extended to increase the area of the capillary walls contacting with ink in the pen point.

Another object of the present invention is to provide the pen points having such an improved inner structure that a plurality narrow slots forming capillary which curve and extend not only in the radial direction but also in the other directions, are arranged in the cross-section, whereby an amount of the ink transferred in the inner capillaries of the pen point is increased and adjusted and that the selective freedom degree of the elastic property of the pen point is increased.

A still further object of the present invention is to easily design the inner structure of the pen point having the suitable properties by simply applying the fundamental design idea of the present invention in the production of the pen points which are suitable for (a) writing instrument for literature (fine writing, middle writing, thick writing),
(b) writing instrument for sketch or painting,
(c) rapidly drying writing instrument using an organic solvent ink,
(d) writing instrument using an ink containing a pigment and
(e) inking passage body of a ball point pen for a water soluble ink, respectively.

The other object of the present invention is to permit various pen points corresponding to the above described various applications to be easily designed from a die provided with a large number of orifices by which a large number of melted monofilaments are united with one another to form continuous rod-shaped bodies.

In order to accomplish such objects, the invention of the above described U.S. Pat. No. 3,932,044 is very useful. The utility of this parent patent will be explained hereinafter. The outlined constitution of this parent invention is as follows. The cylindrical article forming the pen point is composed of a large number of united thermoplastic synthetic resin monofilaments and radially curved narrow slots extending toward the center of the cylindrical article from the inside of the outer periphery of the article are defined by an even number of at least 4 of triangular projected segments. However, in the pen point having such a constitution, the structure of the projected segments is the similar shape in which only the height is different, so that the elasticity of the projected segments per se is very simple and even if the breadth of the bottom of the triangular projections is made narrow and the number of the triangular projections and the defined number of the narrow slots are increased, the ink passage property only depends upon the variation of the ink passage amount corresponding to the increase of the number of the radially extended narrow slots and the elastic property at the writing tip is maintained by a plurality of projected segments having substantially the same property, which are adjacent with one another, so that the elastic property does not vary depending upon the variation of the breadth of the bottom of the projection segments. Accordingly, the parent patent can not satisfactorily obtain the pen points having the fundamentally different properties.

From such a fact, the inventors have searched for the fundamental factors maintaining the properties of the pen point of the above described parent invention based on said pen point.

As the result, it has been found that the fundamental planning idea of the cross-sectional structure of the pen point can be fundamentally converted by taking up the constituting elements in the cross-section of the pen point, that is, the ring portion, the triangular projection segments and the semi-circular projections of the side of the projection segments as the individual independent components, which contribute to the maintenance of the properties of the pen point.

The planning idea according to the present invention is to solve the components constituting the cross-sectional structure of the pen point into a ring portion composed of a large number of united monofilaments, a plurality of trunk portions composed of united monofilaments and projecting inwardly from the inner periphery portion of said ring or these trunks and stem-like segments and branch portions composed of at least one monofilament and projecting sidewards from the side of the trunks and to define narrow slots acting as the capillary by combining and arranging each constituting element of the described trunks, stems and branches in a variety of combination in the inner space of the ring portion constituting the outer periphery portion of the pen point, whereby the pen points having such a fundamental inner structure which can attain the above described various objects, can be obtained.

"Ring portion", "trunk portion", "stem-like segment" and "branch portion" are abbreviated as "ring", "trunk", "stem" and "branch", respectively. The "stem" has no branches, while the "trunk" has branches.

The invention will be explained in more detail. The above described various objects can be accomplished by constituting the pen point, *according to one embodiment of the invention,* with the following structure. In the cross-section, a ring portion forms the outer periphery portion of the pen point, a plurality of trunk portions or the trunk portions and stem-like segments are inwardly projected from the inner periphery of the ring and partition the inside space of the ring and a plurality of branch portions project sidewards from every trunks and partition the remainder of the above described space by curving more finely and complicatedly, these components of the trunks, the trunks and stems and branches being adjacently arranged in such a manner that the top portions, the end portions and the sides of these components are not connected with one another and that these components constitute 2–6 fold axis symmetry wherein the center axis of the ring is the rotary axis, every root of the trunks or the trunks and the stems being connected to the inside of the ring and the branches being connected to the branches portions at the side of every trunk, every component of rings, trunks, stems and branches having at least one size and shape, every trunk provided with branches forming standing tree-formed projections, narrow slots defined by the standing tree-formed projections or by the standing tree-formed projections and the stems being formed in long and curved slots not only in the substantially radial direction but also in the other directions, a center passage being formed by the top portions of the trunks or stems of the number corresponding to the fold number of the above described fold axis symmetry, every side of the narrow slots being formed by connection of circular arcs of a large number of monofilaments, which constitute the elementary components and the narrow slots and the center passage extending from one end to the other end of the pen point.

The arrangement relation of the branches of the standing tree-formed projections, which are in the adjacent relation, is as follows.

(1) The sides of the branches are engaged with one another.

(2) The end portions of the branches are opposed with one another.

(3) The sides of the branches are opposed with one another and the end portions of the branches oppose to the inner periphery of the ring.

The arrangement relation of the branches of the standing tree-formed projections to the trunks or stems, which are in the adjacent relation, is as follows.

(1) The end portions of the branches oppose to the sides of the trunks or stems.

(2) The sides of the branches and the sides of the stems . e engaged and the end portions of the branches oppose to the inner periphery of the ring.

(3) The sides of the branches and the sides of the stems are engaged and the end portions of the branches oppose to the inner periphery of the ring.

(4) The sides of the branches oppose to the top portions of the stems.

According to this construction, the inside space of the ring portion can be partitioned in the radial direction and the other directions, so that the pen point in which the area of the narrow slots and the capillary wall in the end face connecting to the reservoir and the inner portion of the pen point become very large and the amount of ink transferred owing to the capillary function in the pen point is increased and adjusted in whole, can be obtained.

Furthermore, since the infinitely small wedge-shaped capillary walls are formed by connection of circular arcs of a large number of monofilaments, the pen point wherein the absorbing ability of ink due to the capillary function is improved and the ink passage property is stable, can be obtained.

Moreover, the trunks or stems are suspended from the ring in the inner portion of the ring portion of the pen point, so that, in general, the elasticity is more rich in the order of the ring, trunk, stem and branch and the inner structure of the pen point having this constitution is fundamentally rich in the elasticity.

This property rich in the elasticity is lost by connecting the top portions of the trunks or the stems of the number corresponding to the fold number of the fold axis symmetry, which form the center passage of the pen point, through the circumference of one monofilament arranged at the center axis of the ring portion and the rate of the elasticity lost corresponds to the fold number and the rigidity is increased in proportion to the lost elasticity.

Accordingly, the elastic property in the manner structure of the pen point according to the present invention can be variously selected within the scope including such a structure.

According to the present invention having such characteristics, the pen points having the inner structure provided with the ink conveying mechanism suitable for the writing instruments for various uses, the ink conveying properties compatible with the physical and chemical properties of inks to be used for the writing instruments, and the elasticity suitable for various writing instruments, can be easily designed by solving more finely the factors of every component of the trunks, stems and branches among the above described fundamental inner structure, which are the planning idea and combining these factors.

If one embodiment wherein the constituting factors of the inner structure of the pen point is further solvent into factors in the meaning used in the general design of experiment method is shown, the following Tables 1a and 1b are obtained.

TABLE 1a

| | Factor | Level of factor |
|---|---|---|
| Projecting structure | Arrangement (A) | 1 . . . Straight line<br>2 . . . Curve<br>3 . . . Wave<br>4 . . . Polygonal line<br>1 . . . Opposing at the central axis in the cross-section |

TABLE 1a-continued

| | Factor | Level of factor |
|---|---|---|
| of stem portions | direction (B) | |
| | | 2 . . . Opposing at the eccentrical axis of the cross-section |
| | | 1 . . . One($C_1$) |
| | Number of projections (C) | 2 . . . Two or more ($C_2$, $C_3$, . . .) |
| | | 1 . . . Straight line |
| | arrangement (D) | 2 . . . Curve |
| | | 3 . . . Wave |
| | | 4 . . . Polygonal line |
| Projecting structure of branch portions | Direction . . . Angle of connection to the stem portion (E) | 1 . . . Right angle |
| | | 2 . . . Forward angle |
| | | 3 . . . Afterward angle |
| | | 1 . . . One($F_1$) |
| | Number of projections (F) | 2 . . . Two or more ($F_2$, $F_3$, . . .) |

TABLE 1b

| | Factor | Level of factor |
|---|---|---|
| Structure of standing tree-formed projections | Symmetry in left and right (G) | 1 . . . Symmetry in left and right |
| | | 2 . . . Asymmetry in left and right |
| Structure of cross-section of pen point | Fold axis symmetry of standing tree-formed projections (H) | 1 . . . Two fold axis symmetry |
| | | 2 . . . Three fold axis symmetry |
| | | 3 . . . Four fold axis symmetry |
| | | 4 . . . Hn fold axis symmetry |
| Size of each portion | Thickness of stem portions (I) | 1 . . . Fine |
| | | 2 . . . Thick |
| | Thickness of branch portions (J) | 1 . . . Fine |
| | | 2 . . . Thick |
| | Length of stem portions (K) | 1 . . . Short |
| | | 2 . . . Long |
| | Length of branch portions (L) | 1 . . . Short |
| | | 2 . . . Long |

Note: Arrangement (A) and (D) show the arranged form of the individual monofilaments.

The form of the ring portion excluded from the above Tables may be triangule, tetragon, pentagon, hexagon circular but the circular shape is the most popular. The diameter of the pen point to be designed is 0.5–10 mm, preferably 0.5–5 mm.

The dimension factor of the respective portions in the above Table is determined by properly selecting the individual portions so as to connect the monofilaments of the necessary diameter and number depending upon the desired properties of the pen point within the range of 0.02–0.3 mm of the diameter of the individual monofilaments for constituting the trunk, stem and branch portions and the monofilaments are arranged by combining the orifices on the die.

Moreover, the arranged shape and the uniting angle of the branch portions composed of monofilaments can be optionally considered.

The invention will be explained in more detail with reference to the accompanying drawings, wherein.

Figure 10A:
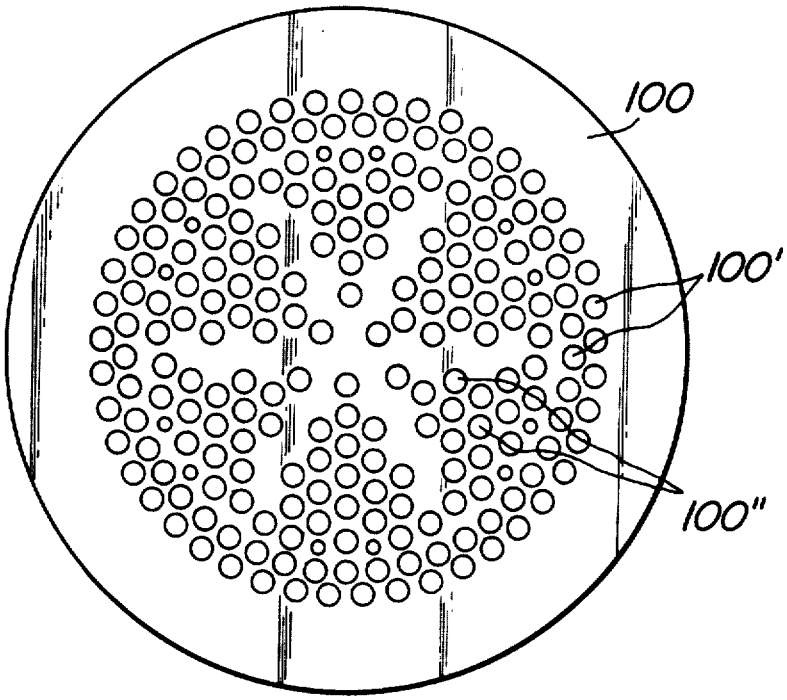
Figure 11A:
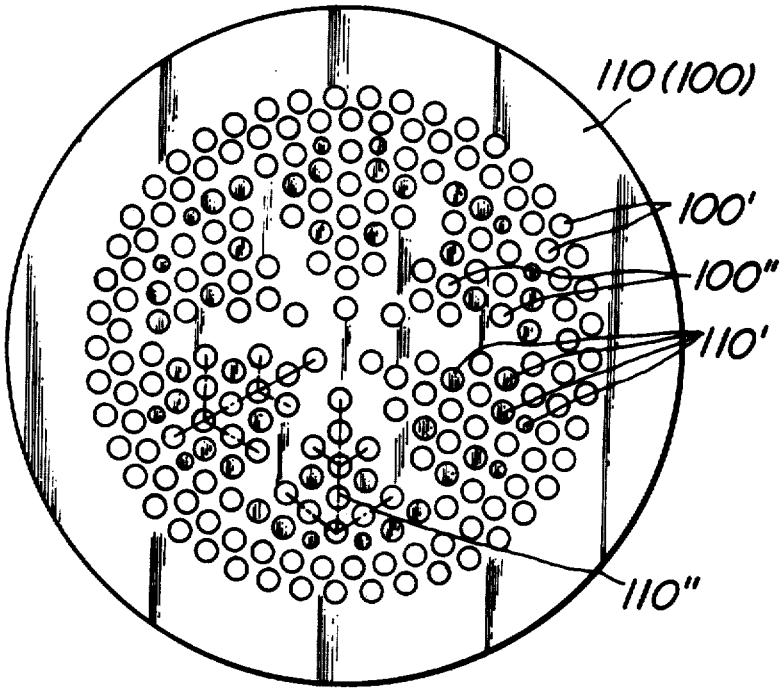
Figure 11B:
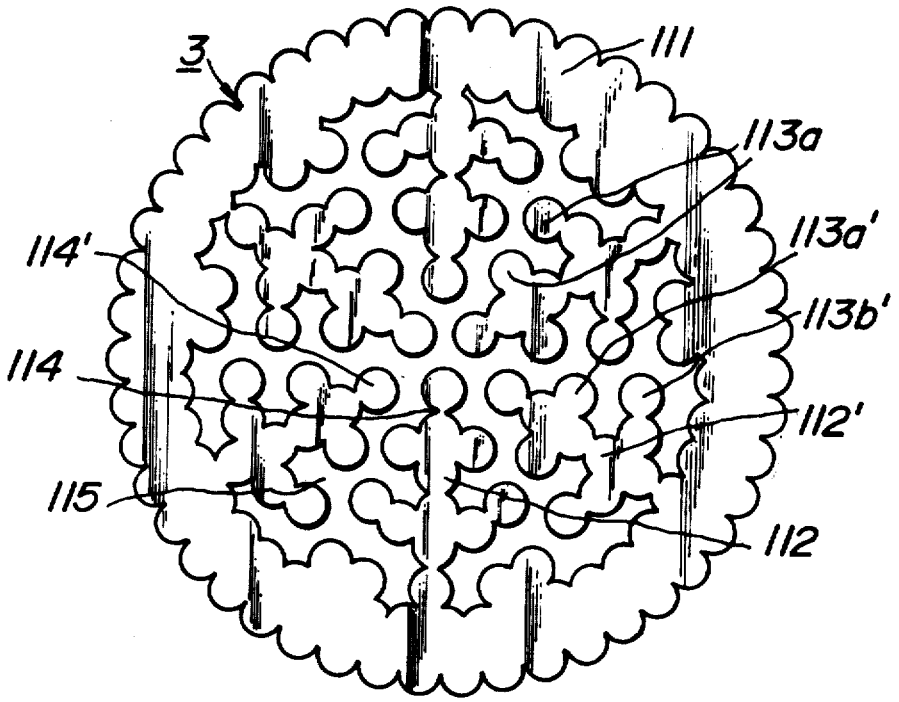
Figure 12A:
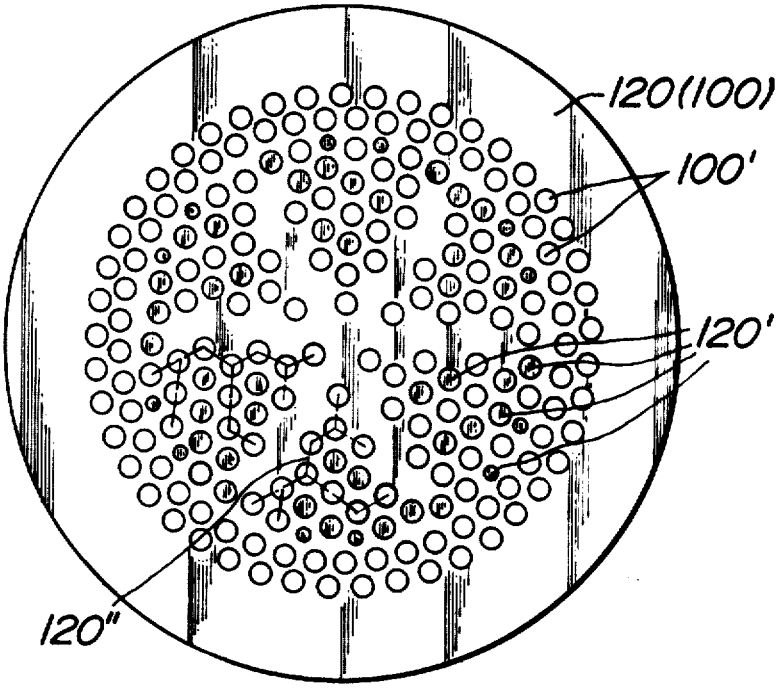
Figure 12B:
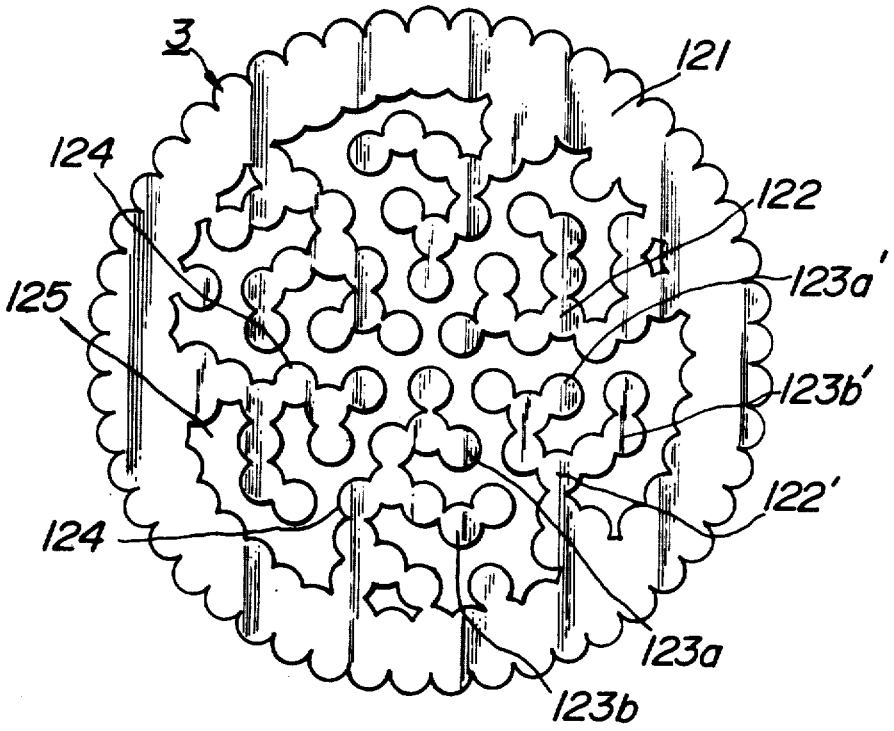
Figure 13A:
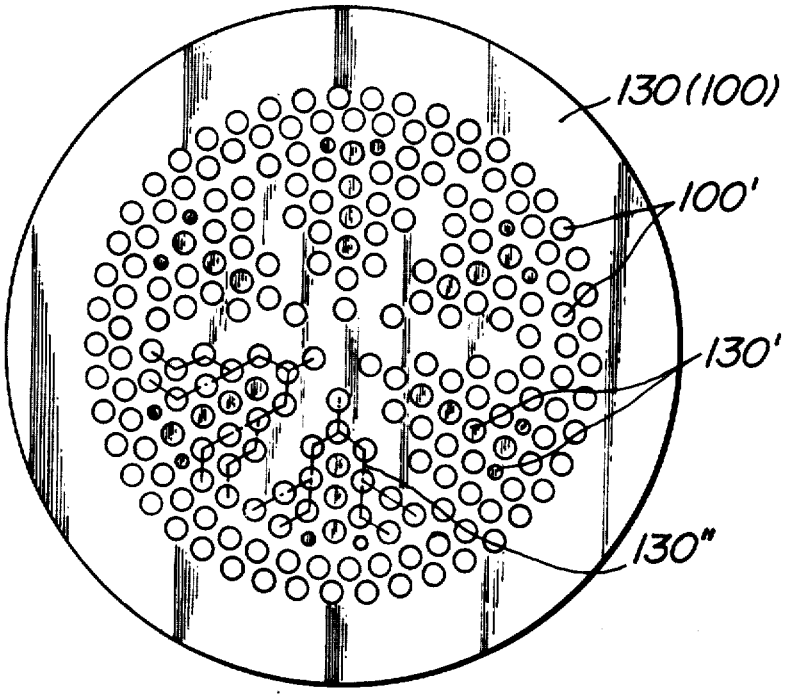
Figure 13B:
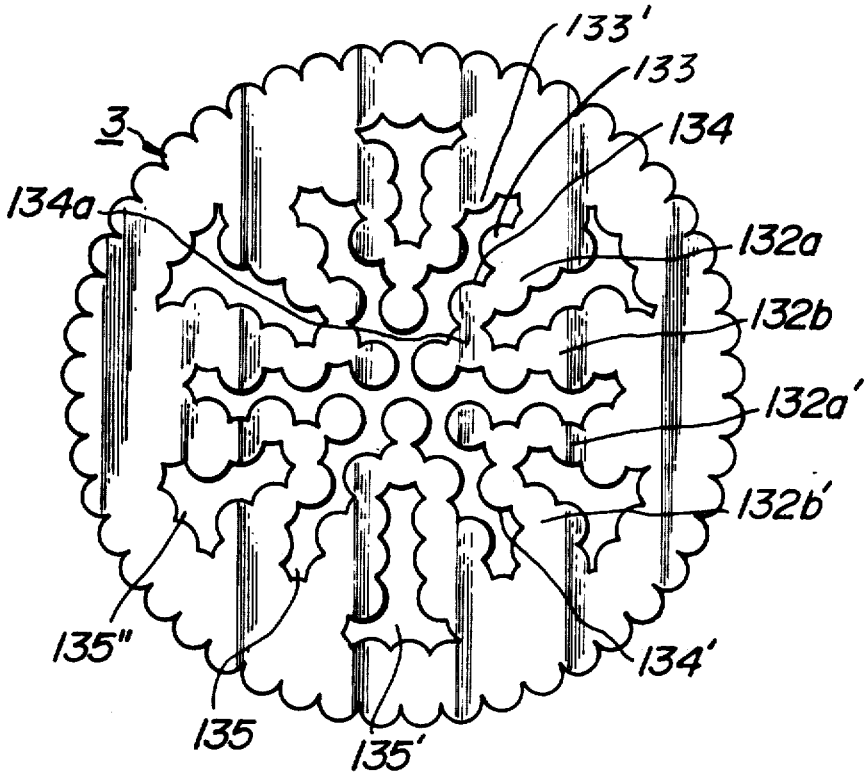

FIGS. 10a and 19b show end views of the extrusion molding die and the pen point molded by the die disclosed in U.S. Pat. No. 3,932,044 (DOS. 2456905.5);

FIGS. 11a, 12a and 13a are end views showing arrangements of orifices of dies modified by applying the present invention to the die in FIG. 10a respectively; and FIGS. 11b, 12b and 13b show end views of the pen points molded by the dies shown by FIGS. 11a, 12a and 13a respectively.

Figure 1A:
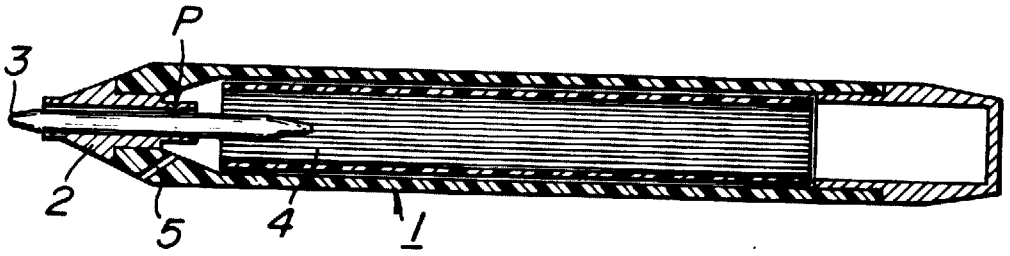
FIGS. 1a and 1b show the longitudinal sectional view of the writing instrument provided with the pen point of the present invention.

Referring to FIG. 1a, a pen point 3 composed of united monofilaments, if necessary, is inserted into a nib holder 2 and is pressed fit thereby and then is provided in the pen body 1 of writing instruments, such as sign pen and the like. The nib holder is not necessarily needed and the pen point may be fixed in the pen body 1 directly by an appropriate means.

The nib holder 2 is pressed in the arrow P direction at a proper position in the pen body 1 to deform the nib holder, whereby the pen point 3 is fixed against the nib holder 2. A reservoir 4 filled with ink is provided within the pen body 1. An end portion of the pen point 3 positioning in the pen body 1, that is an end portion which is not the writing tip, is inserted into the reservoir 4 and arranged therein, so that the ink in reservoir 4 is supplied to the portion to be written, for example a paper surface, through the pen point 3. In the pen body 1 is formed an air passageway 5, so that the flooding out of ink from the pen point 3 owing to the enhanced inner pressure of the pen body 1 due to the increase of temperature can be prevented.

Instead of the use of the nib holder 2, the pen point 3 may be directly fixed at the top portion of the pen body 1.

Figure 1B:
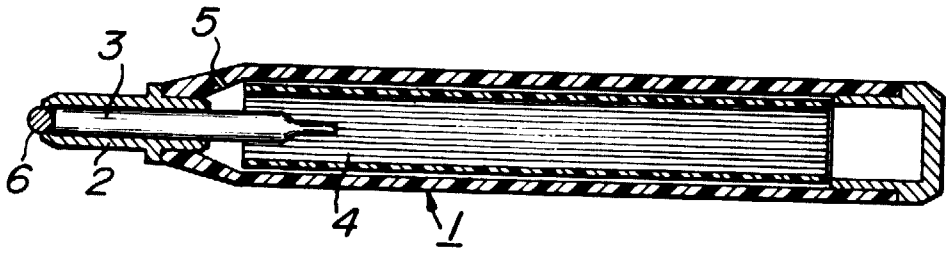

The pen point 3 of the present invention can be used as an element for conveying ink as well as the writing element. FIG. 1b shows such as embodiment.

In this embodiment, the tip of the pen point 3 is ground in a concave form and a ball 6 is supported at the concave tip portion and then the tip portion of the nib holder 2 is tightly pressed around the mid-section of ball 6, so as not to fall down therefrom. In this case, the pen point 3 acts not only as a supporter of the ball 6 but also as an element for conveying ink. Accordingly, the structure of the writing instrument can be simplified and further the productivity can be improved. This writing instrument can be applied for a ball point pen using water soluble ink.

FIGS. 2a–2d are the side views of the pen points 3 of the present invention. As shown in these drawings, one end 3a, 3b, 3c or 3d of the pen points 3 is generally ground into a conical shape as the writing tip.

Figure 2A:
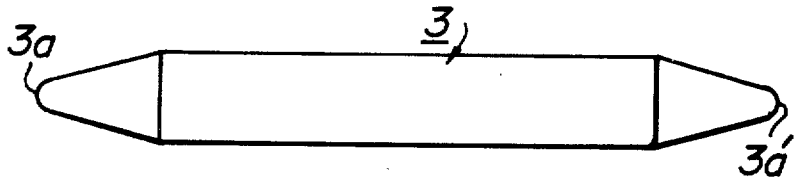
FIG. 2a–2d show the side views of various pen points of the present invention.

In the pen point 3 in FIG. 2a, the other end 3a' is also ground in the same manner as in the writing tip.

Figure 2B:
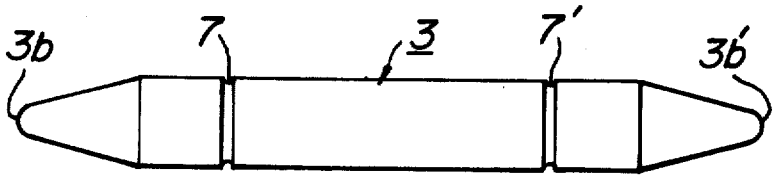

In the pen point 3 in FIG. 2b, the shapes in both the ends 3b and 3b' are the same as in the embodiment of FIG. 2a. Furthermore, in this pen point 3 a pair of circular grooves 7 and 7' are formed at the cylindrical portion having the same diameter between both the ends of the pen point 3. These circular grooves 7 and 7' are engaged with ridges (not shown) provides on the inner circumference at the top portions of the pen body 1, whereby the pen point 3 is fit in the pen body 1. Accordingly, in this case, the nib holder 2 is not necessary.

Figure 2C:
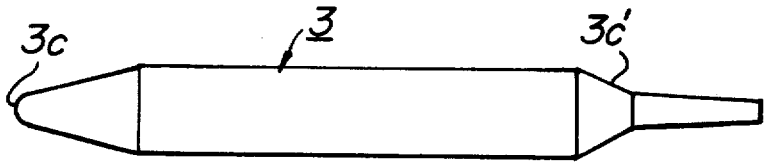

In the pen point 3 in FIG. 2c, the end portion 3c' to be inserted into the reservoir 4 is different from the writing tip 3c and has a relatively elongated form, by which the effective contact area between the pen point 3 and the reservoir 4 is increased and an ink can be conveyed uniformly and constantly.

Figure 2D:
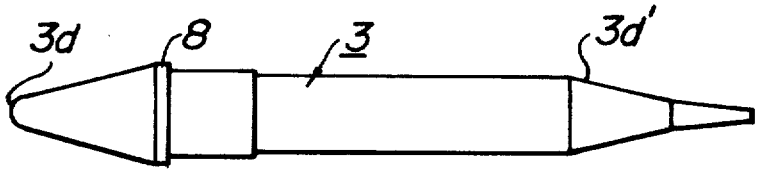

In the pen point 3 in FIG. 2d, the shapes of both the ends 3d and 3d' are substantially the same as in the case of FIG. 2c. Furthermore, a circular shoulder portion 8 is provided behind the writing tip 3d and this shoulder portion 8 acts as a stopper when the pen point 3 is fit with in the pen body 1.

FIG. 10a shows an arrangement of orifices of an extrusion molding die disclosed in U.S. Pat. No. 3,932,044 (DOS. 2456905.9) filed by the same inventor as in this case. This die 100 is provided with orifices 100' which form the circular portion of the outer periphery of the pen point and a large number of orifices 100" which are regularly arranged in three fold axis symmetry against the center axis of the die 100 and form the triangular projections of the pen point.

Figure 10B:
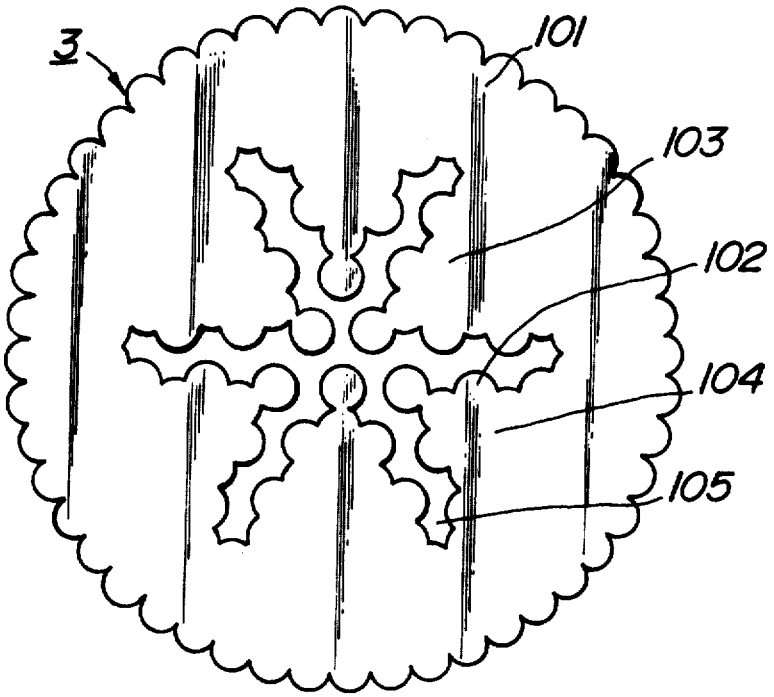

FIG. 10b shows a cross-sectional view of a pen point moled by using the die 100 in FIG. 10a. The pen point 3 is one obtained by drawing a melted rod, wherein a large number of filaments are connected mutually, into a proper fineness and cooling the drawn rod and cutting the cooled rod into an appropriate length. The cross-sectional structure of this pen point 3 is provided with triangular projections 103 and 104 arranged regularly in three fold axis symmetry corresponding to the arrangement of the orifices in the die 100. The pen point having three projections 103 and 104 is designed so as to suit to fine writing and has a high rigidity and the fine space 105 defined by these projections is relatively small in the space amount and the space number but the spaces are uniformly distributed in the cross-section of the pen point, so that if this pen point 3 is limited to application for fine writing, an excellent property can be developed.

The most important another characteristic of the present invention consists in that various pen points having the internal structures conformable to the desired use respectively can be easily molded by means of a basic die 100 by applying the internal structure of the pen point according to the present invention to the die 100 designed for the pen point for fine writing wherein a large number of orifices are regularly arranged in the fold axis symmetry.

FIGS. 11a, 12a and 13a show the dies by which a part of embodir nts for carrying out the present invention by applying each level of factor of the number of projections, arrangement and direction is applied to the die 100 of FIG. 10a and slightly modifying orifices 100" of the die 100 according to the above described each level of factor, is made apparent.

The modification of the die can be made by closing the orifices 100' and 100" at a desired portion with a malleable metal material.

FIG. 11a shows a die 110, in which marked orifices 110' are closed and an arrangement 110" of opened orifices shows two kinds of standing tree forms (see dot-dash-line in FIG. 11a) having different heights, which project inwardly from circularly arranged orifices 110' and each of which is symmetrical in left and right, and constitutes three fold axis symmetry.

FIG. 12a shows a die 120, in which the marked orifices 120' in the die 100 are closed and an arrangement 120" of opened orifices shows two kinds of standing tree forms (see dot-dashed line in FIG. 12a) having different heights, each of which is asymmetrical in left and right, and constitutes three fold axis symmetry.

FIG. 13a shows a die 130, in which marked orifices 130' of the die 100 are closed and an arrangement 130" of opened orifices shows two kinds of stem forms having different heights, each of which has a cavity, and constitutes three fold axis symmetry.

FIGS. 11b, 12b and 13b show cross-sectional views of pen points molded by the dies 110, 120 and 130 and the prototype of these pen points is the pen point 3 molded by the die 100.

FIG. 11b shows a cross-section of a pen point molded by the die 110. If various factors and levels in the above Tables 1a and 1b are applied to the pen point 3, the following Table 4 is obtained.

TABLE 4

| Control order | Factor | Level | Combined Level | Combined Symbol | Combination of level symbol following to limitation condition | | | | | | | |
|---|---|---|---|---|---|---|---|---|---|---|---|---|
| 1 | Fold axis symmetry | | 3 fold | $H_2$ | | | $H_2$ | | | | | |
| | | Projection number | 2 | $C_2$ | | | $C_2$ | | | | $C_2$ | |
| 2 | Trunk structure | Arrangement | Straight line | $A_1$ | | | $A_1$ | | | | $A_1$ | |
| | | Direction | Opposing at central axis | $B_1$ | | | $B_1$ | | | | $B_1$ | |
| | | Projection number | 4 | $F_4$ | $F_4$ | $F_4$ | $F_4$ | $F_4$ | $F_4$ | $F_4$ | $F_4$ | $F_4$ |
| 3 | Branch structure | Arrangement | Straight line | $D_1$ | $D_1$ | $D_1$ | $D_1$ | $D_1$ | $D_1$ | $D_1$ | $D_1$ | $D_1$ |
| | | Direction | Right angle and forward acute angle | $E_1$, $E_2$ | $E_1$ | $E_1$ | $E_2$ | $E_2$ | $E_1$ | $E_1$ | $E_2$ | $E_2$ |
| Indication | Symmetry in left and right | | Symmetry | $G_1$ | | | | $G_1$ | | | | |

In the above Table 4, the control order of each of the primary, secondary and tertiary factors are more finely divided and the level of each factor is combined by one-way branch layout of the experiment method and this combination shows one of a large number of combinations. There are many methods in the combination of each factor but if proper 2–4 levels are selected from the above described preferable level ranges and combined by one-way branch by using orthogonal array having a pertinent size selected from 2" or 3" system, a large number of combinations can be obtained relatively simply.

The pen point 3 (FIG. 11b) in the above Table 4 has a cross-sectional structure in which two kinds of standing tree-formed projections 114 and 114' having different heights, each of which projects inwardly from the circular portion 111 and is symmetrical in left and right, are adjacently arranged in three fold axis symmetry. 112 and 112' show the trunk stem portions and 113a, 113a' and 113b' show the branch portions. These projections 114 and 114' are more elastic in rigidity than the projections 103 and 104 of FIG. 10b and reversely the space amount and the space number of the fine spaces 115 are larger than those of the fine spaces 105 in FIG. 10b. Accordingly, the pen point 3 in FIG. 11b in rich in flexibility different from the pen point in FIG. 10b and is larger in ink supplying amount.

FIG. 12b shows a cross-section of the pen point molded by the die 120. In this pen point 3, each factor in the above Tables 1a and 1b is combined so as to form the standing tree-formed projections 124 and 124' having polygonal line shape. 122 and 122' are the trunk portions and 123a, 123b, 123a' and 123b' are the branch portions and 125 is the fine space. These projections are more elastic in rigidity than the above described projections 114 and 114'.

FIG. 13b shows a cross-section of the pen point molded by the die 130. In this pen point, only the factor of the trunk structure from each factor of the above Tables 1a and 1b is combined so as to form the standing tree-formed projections in which the trunk portion has a cavity. 132a, 132b, 132a' and 132b' are the trunk portions, 134a is a connecting portion of two trunk 132a and 132b. 135 is fine space and 135' and 135'' are cavity-shaped fine spaces. These projections 134 and 134' are lower in rigidity than the projections 103 and 104 in the above described FIG. 10b but are higher in rigidity than the projections 114 and 114' in FIG. 11b.

However, this structure is very similar to the pen point having the structure claimed in U.S. Pat. No. 3,932,044.

Accordingly, when the pen points as shown in FIGS. 10b, 11b, 12b and 13b are used for writing, these pen points are different in the writing properties and are applicable for various uses.

As mentioned above, in the present invention, the pen points having a variety of cross-sectional structures can be molded from one die by applying a combination of proper levels of the structural factors of the stem and the branch to a die wherein a large number of orifices are arranged in the fold axis symmetry.

If this idea is further developed, the pen points having a large number of kinds of cross-sectional structures in every fold axis symmetry can be easily obtained by applying each factor of the present invention to the die wherein a large number of orifices constituting the fold axis symmetry are precisely arranged on a concentrical regular polygon or circle extending outwardly from the center of die.

FIGS. 3–9 are the transversal cross-sectional views of various embodiments of the pen points according to the present invention.

Figure 3:
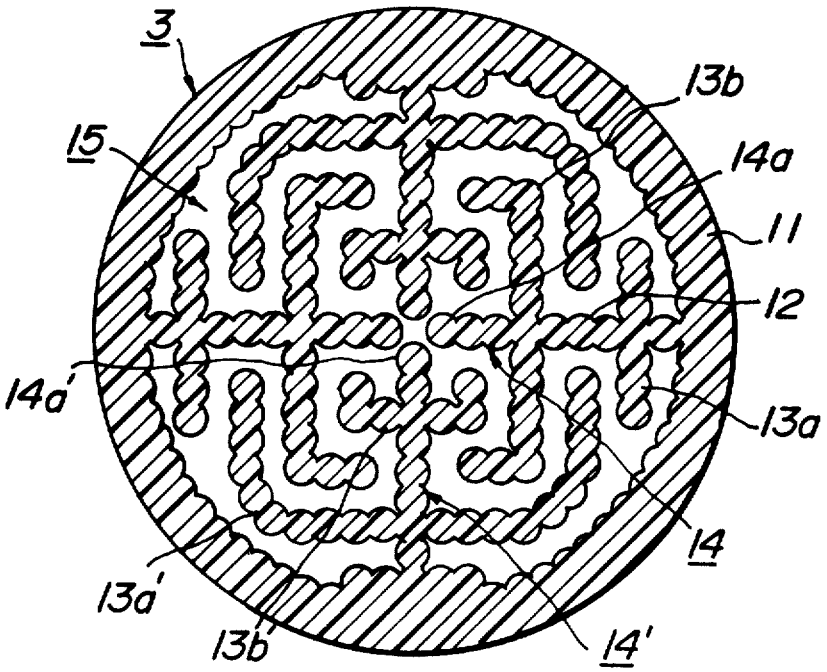
FIGS. 3–9 show the cross-sectional views of various pen points of the present inventions.

FIG. 3 shows Example 1 of the pen point according to the present invention. This pen point 3 has a circular portion 11 at the outer circumference and this circular portion 11 forms an outer periphery of the pen point 3. The pen point 3 is formed of synthetic resin filaments. Accordingly, the inner periphery of the circular portion 11 is formed of connected semicircles of circumference of the monofilaments, the individual filaments of which are bonded.

From the inner periphery of the circular portion 11 four trunk portions 12 are projected toward the center of the pen point 3. These trunk portions 12 are mutually arranged in an adjacent relation at intervals of a moderate space. The trunk portions 12 have the cross-section of connected semicircles of circumference of the monofilaments as in the inner periphery of the circular portion 11.

From each trunk portion 12, branch portions 13a, 13b, 13'a and 13'b are projected toward both sides. Among them, the branch portion 13a forms linear and the other branch portions 13b, 13'a and 13'b have L-shapes in view of the arrangement between mutual relative portions as mentioned hereinafter. The branch portions 13a, 13b, 13'a and 13'b also have the cross-section of connected semicircles of circumference of the monofilaments in the same manner as mentioned above.

In this embodiment, the diameter of the pen point 3 is about 3 mm and the diameter of the monofilament to constitute each portion of the pen point is about 0.14 mm and the filament is composed of polyethylene having a high density.

Two kinds of standing tree-formed projections 14 and 14' are formed of the trunk portion 12 and the branch portions 13a, 13b, 13'a and 13'b. The top portions 14a and 14'a of these standing tree-formed projections 14 and 14' are opposed at the center of the axis. Each of the standing tree-formed projections 14 and 14' is formed symmetrically in the left and right sides and the adjacent standing tree-formed projections 14 and 14' have different forms of branch portions 13a, 13b, 13'a and 13'b. Therefore, the trunk portions 12 are arranged in four fold axis symmetry but the standing tree-formed projections 14 and 14' form two fold axis symmetry.

The standing tree-formed projections 14 are crossed with one another so as to remain inlet-formed slots 15 which constitute conduits for conveying ink. An average of the width of the slot is about 0.15 mm.

In the pen point 3 of the embodiment of the present invention, the slots 15 acting as the capillary tubes having a relatively large width are distributed uniformly in the interior. Furthermore, the projection heights of the trunk portion 12 and projection lengths of the branch portions 13a, 13b, 13'a and 13'b are large and these portions are formed of the monofilaments having the same fineness. Accordingly, the elasticity is high and the flexible feeling can be obtained and a pigment ink having a large grain size can be easily flowed out without causing clogging. This pen point 3 is suitable for the pen point for a paint pen which uses a rapid drying pigment ink.

Figure 4:
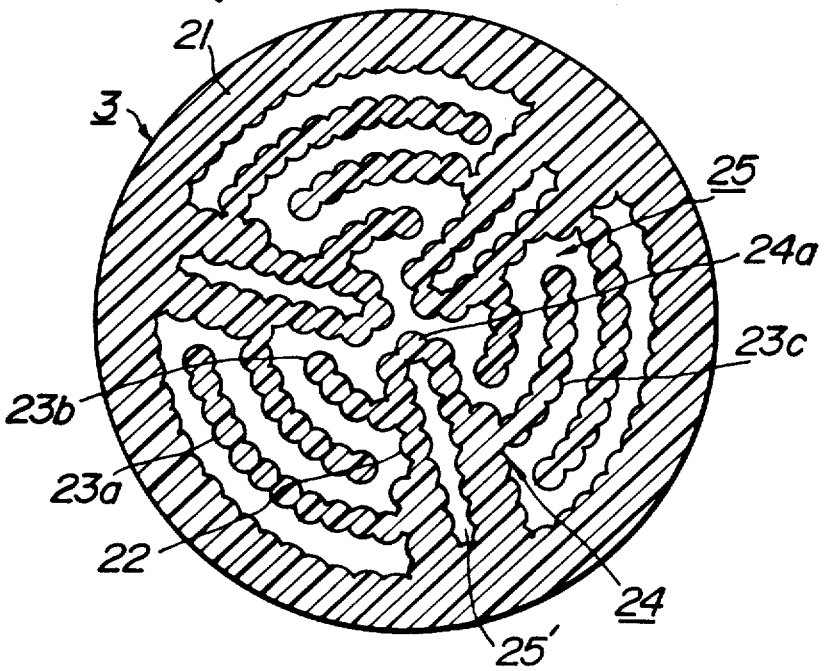

FIG. 4 shows Example 2 of the pen point of the present invention.

In this example, three standing tree-formed projections 24 are arranged so that the top portions 24a of these projections are opposed at the center of the axis. The conjunct trunk portion 22 of the projection 24 has a somewhat particular form in which a pair of trunk portions each having substantially the same structure as in the trunk portion 12 in Example 1 are arranged in parallel and the two trunk portions are cross-linked and connected at the top portion 24a and in the inside of the conjunct trunk portion 22 has a slot 25'. The branch portions 23a–23c of the projection 24 form asymmetry arcs in the left and right sides and consequently all the adjacent projections 24 are of the same form. The projections 24 have three fold axis symmetry.

In this example, the diameter of the pen point 3 is about 1.2 mm and the filament is composed of polyacetal and the diameter of said filament is about 0.05 mm and the width of the slot 25 is about 0.05 mm.

The pen point 3 in this example has uniformly distributed narrow slots 25 and 25' having a strong capillary function and has hollow stem portions 22 and the branches 23 having a low projection length, so that the pen point is rich in the elasticity and the thickness of the writing line is varied by usual variation of writing pressure. Therefore, this pen point 3 is preferable for a writing instrument for an over head projector which uses a rapid drying ink containing an organic solvent or suitable for a writing instrument for middle writing.

Figure 5:
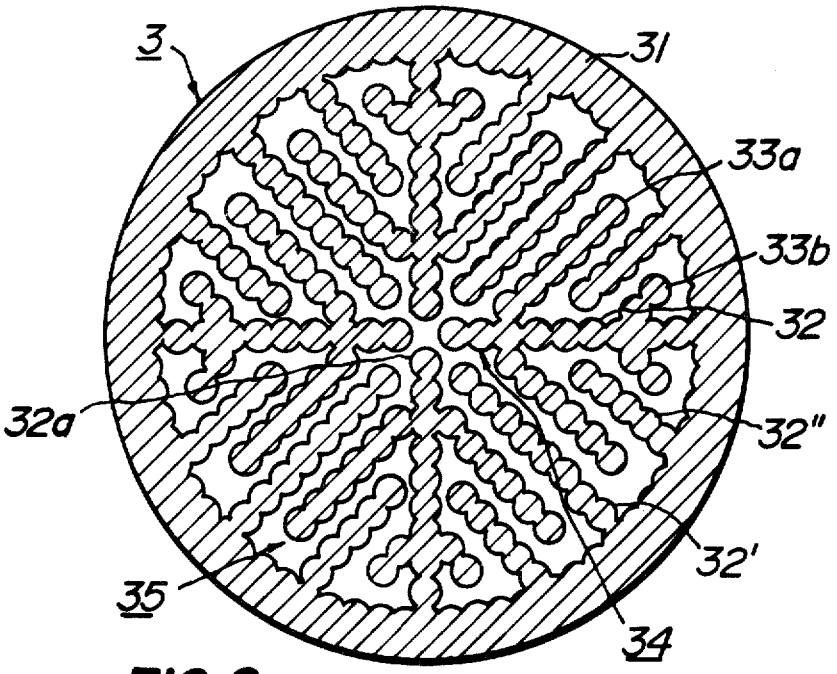

FIG. 5 shows Example 3 of the pen point 3 of the present invention.

In this example, the four trunk portions 32 having the same height are arranged so that the top portions 32a of these trunk portions are opposed at the center of the axis. From these trunk portions 32, are projected the branch portions 33a and 33b toward the circular portion 31 of the pen point 3 in the symmetry in the left and right sides.

Moreover, between the mutual relatively long branch portions 33a of the adjacent trunk portions 32, are projected the stem segments 32' having a somewhat lower height than these trunk portions 32 toward the center of the axis of the pen point from the circular portion 31 in the total number of 4. Furthermore, between the relatively longer branch portions 33a of the trunk portion 32 and the relatively shorter branch portions 33b, are projected the stem segments 32'' having a lower height than the above described stem segments 32' toward the center of the axis of the pen point 3 in the total number of 8.

This pen point 3 has four fold axis symmetry as seen by observing the standing tree-formed projection 34 formed of the trunk portions 32 and the branch portions 33.

In this example, the diameter of the pen point 3 is about 2 mm, the filament is composed of polyacetal and has a diameter of about 0.08 mm and the width of the narrow slot is about 0.05 mm.

In the pen point 3 of this example, the narrow slots 35 having a high capillarly function are uniformly distributed in the interior, so that the uniform capillary function can be obtained over the whole cross-section of the pen point. In addition, since the balance of the structure of the intersecting arrangement of the trunk portions 32 and/or the branch segments 33, and the stem portions 32' and 32'' is favorable, a moderate elasticity can be attained under a usual writing pressure. Therefore, this pen point is preferable for writing instruments of a ball point pen for liquid ink, middle writing and the like.

Figure 6:
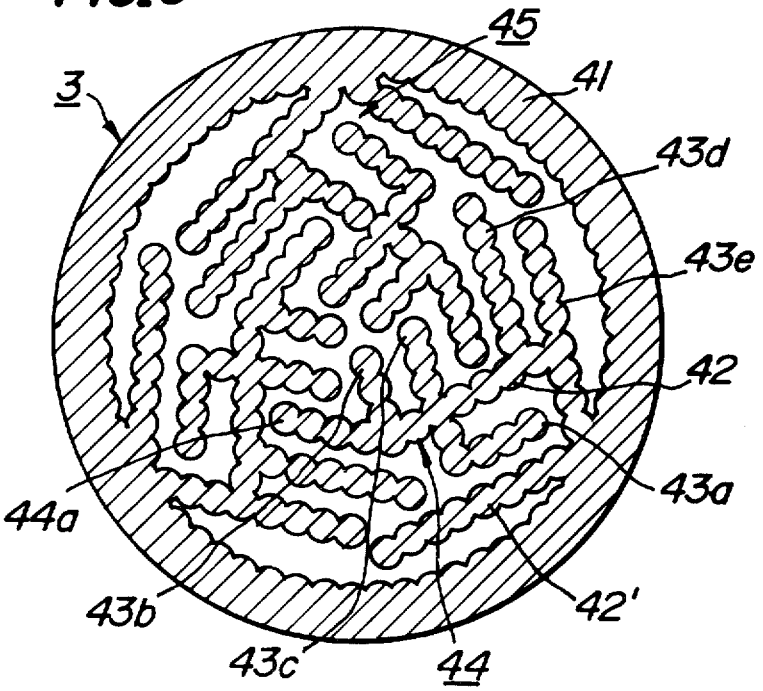

FIG. 6 shows Example 4 of the pen point of the present invention.

In this example, three same bent trunk portions 42 are arranged so that the top portions 44a of these trunk portions are opposed at a position deviated from the center of the pen point 3. In these trunk portions 42, the branch portions 43a–43e which are asymmetry in the left and right sides are projected. Among them, the branch portion 43a has such a form that said portion is bent substantially in L-form toward the joining point of the trunk portion 42 and the circular portion 41. The apexes of the branch portions 43b are opposed at the center of the pen point at such a position that these apexes form a regular triangle. Furthermore, each apex of the branch portions 43c is arranged at each apex of a larger regular triangle in which the top of the branch portion 43b positions at substantially the middle point of each side of said regular triangle. Between th branch portion 43c and the branch portion 43d projected in substantially parallel thereto, is put the top portion 44a of the next standing tree-formed projection 44 on the right side. From adjoining point of the standing tree-formed projection 44 and the circular portion 41 is projected a stem segment 42' in substantially parallel to the branch portion 43a of the projection 44 so that said stem segment 42' opposes a branch portion 43e of the next standing tree-formed projection on the left side. This pen point 3 has the three fold axis symmetry. Furthermore, this pen body 3 is specific structure and the above described top portion 44a of the trunk portion is considered to be the top portion of the branch portion and the above described top portion 43b of the branch portion is considered to be the top portion of the trunk portion and further the stem segment 42' is considered to be a branch portion extended from the root of the trunk portion 42.

In this example, the diameter of the pen point 3 is about 2 mm, the filament is composed of nylon, the diameter of said filament is about 0.08 mm and the width of the narrow slot is about 0.05–0.15 mm.

In the pen point 3 of this example, the narrow slot 45 having a specific form is extended over the whole cross-section of the pen point. By arranging the trunk portion 42 in a polygonal line form or an arm form, the extension of the stem portion can be enlarged. This pen point 3 has a very flexible elasticity and hence is preferable for thick writing, sketch pen and the like.

Figure 7:
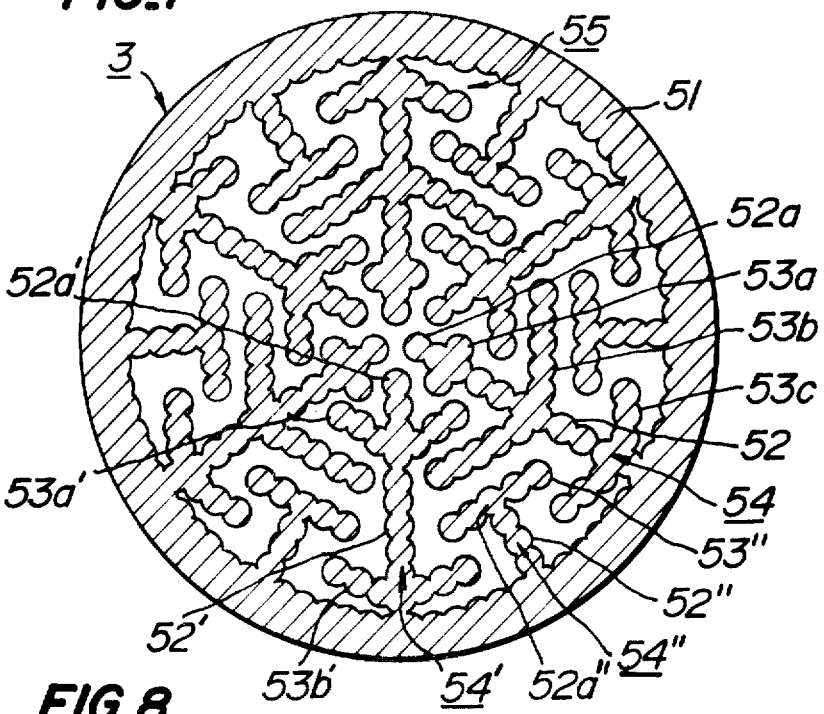

FIG. 7 shows Example 5 of the pen point 3 of the present invention.

In this example, three trunk portions 52 are projected toward the center of the pen point from the circular portion 51. In these trunk portions 52, the branch portions 53a–53c are projected in symmetry in the left and right sides. Furthermore, three trunk portions 52' are projected toward the center of the pen point 3 from the circular portion 51. The trunk portions 52' are a little lower than the trunk portion 52 and each apex 52a of the trunk portion 52 positions at the middle point of each side of the regular triangle formed by the apexes 52'a. This trunk portion 52' has the branch portions 53'a and 53'b projected in symmetry in the left and right sides. From the circular portion 51 are projected the short trunk portions 52'' between the mutually adjacent trunk portions 52 and 52' and at an apex 52''a thereof are connected symmetry branch portions 53'' in the left and right sides. Accordingly, in this pen point 3, three different standing tree-formed projections 54, 54' and 54'' are formed. As seen from FIG. 7, these projections 54, 54' and 54'' are mutually crossed through considerably tangled narrow slots. This pen point 3 has three fold axis symmetry.

In this example, the diameter of the pen point 3 is about 2.5 mm, the filament is composed of polypropylene and has a diameter of about 0.1 mm and the width of the narrow slot is about 0.05–0.1 mm.

In the pen point 3 of the present invention, the narrow slots 55 having such a width that the capillary function is strong, are uniformly distributed in the interior and consequently uniform capillary function can be obtained over the whole cross-section of the pen point.

Since the state of the intersecting arrangement of the standing tree-formed projections 54, 54' and 54'' is favorable, a moderate elasticity can be obtained under a usual writing pressure. This pen point 3 is preferable for a thick writing pen, a painting pen for schoolboy and the like.

Figure 8:
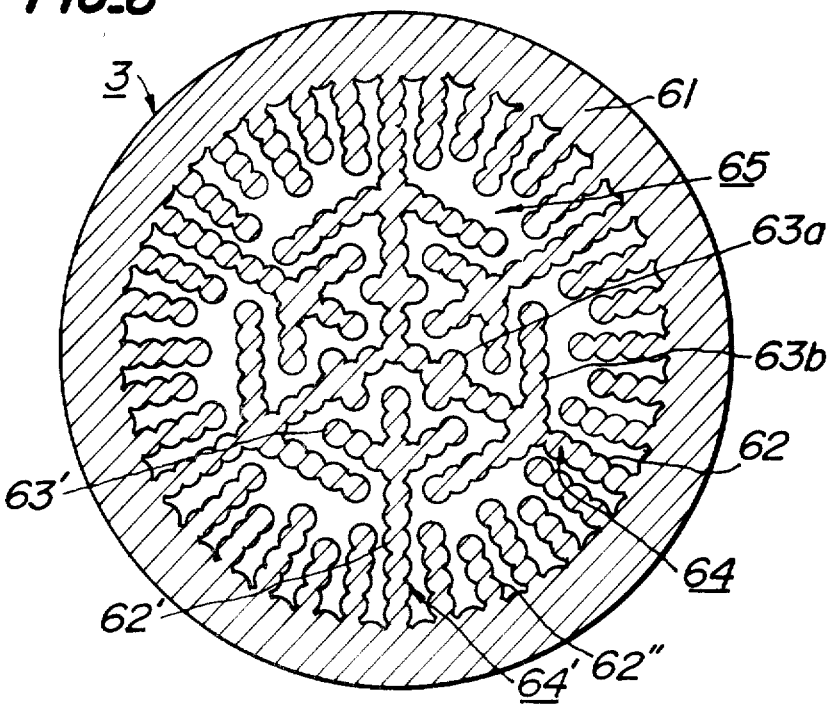

FIG. 8 shows Example 6 of the pen point of the present invention.

In this example, three trunk portions 62 are projected toward the center of the pen point 3 from the circular portion 61 and are mutually joined at the center. These trunk portions 62 are provided with the symmetrical branch portions 63a and 63b in the left and right sides. Between these stem portions are projected three trunk portions 62' which are lower in the height than the trunk portions 62 from the circular portion 61 and in these trunk portions 62', the branch portions 63' positioning between the above described branch portions 63a and 63b are projected in symmetry in the left and right sides. From the circular portion 61, are projected a plurality of lower stem segments 62'' inwardly in the radial direction between the trunk portions 62 and the stem portions 62''. This pen point has three fold axis symmetry.

In this example, the diameter of the pen point 3 is about 2.5 mm. the filament is composed of polyacetal and has a diameter of about 0.1 mm and the width of the narrow slot 65 is about 0.05–0.07 mm.

In the pen point 3 of this example, the standing tree-formed projections are formed of the trunk portions 62 and 62' and the branch portions 63a, 63b and 63' and the projections 64 are mutually joined at the center of the pen point. Accordingly, a moderate elasticity and toughness can be obtained. This pen point is suitable for fine writing and the like.

Figure 9:
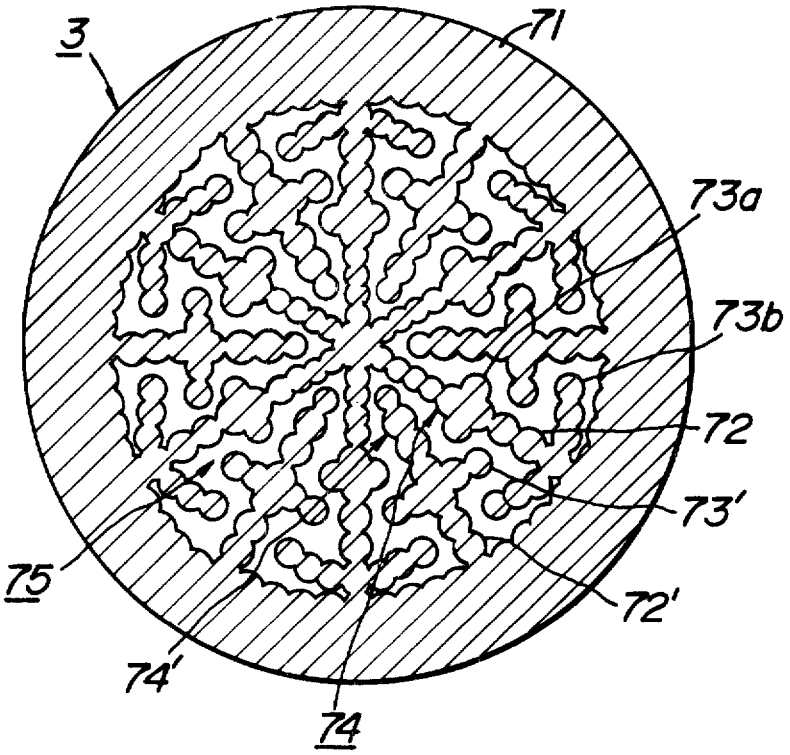

FIG. 9 shows Example 7 of the pen point 3 of the present invention.

In this example, six trunk portions 72 are projected toward the center of the pen point 3 from the circular portion 71 and these projections are mutually joined at the center of the pen point 3 as in Example 6. These trunk portions 72 are provided with the branch portions 73a and 73b projected in symmetry in the left and right sides. Between these trunk portions 72, are projected six stem portions 72' which are a little lower than these trunk portions 72, from the circular portion 71 and in these trunk portions 72', the branch portions 73' positioning between the above described branch portions 73a and 73b are projected. The above described constitution is the same as in the above described Example 6, except for the difference in the number of the trunk portions. Even if the number of the stem portions reaching the vicinity of the center is large, when the narrow slots 75 are formed at the center portion of the cross-section of the pen point 3, it is desirable to make the diameter of the monofilaments forming the trunk portions 72 and 72' in the center portion smaller than that of the monofilaments in the outer periphery.

In this example, the diameter of the pen point 3 is about 2.0 mm, the filament is composed of polyacetal and has a diameter of about 0.05–0.10 mm and the width of the narrow slot 75 is about 0.03–0.08 mm. This pen point 3 has six fold axis symmetry.

In the pen point 3 in this example, the diameter of the filaments forming the standing tree-formed projections 74 and 74' is smaller in the center portion of the pen point 3, so that the standing tree-formed projections can be arranged in a larger number and in more density. Accordingly, a moderate rigidity can be obtained and the retainability and the retained amount of ink are increased.

This pen point is suitable for slender writing pen to be used in carbon copy.

What is claimed is:

1. In pen point for writing instruments which is a rod-shaped wick formed by uniting molten synthetic resin monofilaments, wherein radially curved narrow slots extend toward the center of the wick from an outer periphery portion (ring portion) in the cross-section and the radial narrow slots are defined by a plurality of segments projected from the ring portion, an improvement comprises that the rod-shaped wick is provided in the cross-section with curved narrow slots extending not only in the substantially radial direction toward the center from the inside of the ring portion but also in the other directions, said narrow slots are defined by the components of the pen point consisting of the ring portion forming the outer periphery of the rod-shaped wick, a plurality of trunk portions or trunk portions and stem segments which are projected inwardly from the inner periphery of the ring and partition the inner space of the ring and a plurality of branch portions, which are branched and projected from every trunk and additionally partition the remainder of the above described space, said components of the trunks, the trunks and stems and branches are adjacently arranged so that the top portions, the end portions and the sides of these components are not connected with one another and that these components constitute 2–6 fold axis symmetry wherein the center axis of the ring is the rotary axis, every component of the ring, the trunks, the stems and the branches has at least one size and shape, every trunk provided with branches form at least one of standing tree-formed projections in the inside of the ring, the trunks or the stems of the number corresponding to the fold number of the above described fold axis symmetry are opposed at the center portion to form a center passage, every side of the narrow slots is formed by connection of circular arcs of a large number of monofilaments, which constitute the elementary components and said center passage and the narrow slots extend from one end to the other end of the pen point.

2. The pen point as claimed in claim 1 wherein the narrow slots formed in the inside of the ring are defined by the standing tree-formed projections constituted with at least 2 trunks and not more then 8 of branches branched and projected from one side of each trunk.

3. The pen point as claimed in claim 2, wherein said standing tree-formed projections are formed in such a state that the side of the trunk and the end portion of the branches of the standing tree-formed projections, which are mutually in the adjacent relation, are opposed and the narrow slots are formed between the branches of the respective standing tree-formed projections.

4. The pen point as claimed in claim 2, wherein said standing tree-formed projections are formed in such a state that the side of the trunk and the side of the branches of the standing tree-formed projections, which are mutually in the adjacent relation, are opposed and the end portion of said branches and the inner periphery of the ring are opposed and the narrow slots are formed between the branches of the respective standing tree-formed projections.

5. The pen point as claimed in claim 1, wherein the narrow slots formed in the inside of the ring are defined by the standing tree-formed projections constituted with at least 2 trunks and not more than 16 of branches branched and projected from both sides of each trunk.

6. The pen point as claimed in claim 5, wherein said standing tree-formed projections are formed in such a state that the end portions of the branches of the standing tree-formed projections, which are mutually in the adjacent relation, are opposed and the narrow slots are formed between the branches of the respective standing tree-formed projections.

7. The pen point as claimed in claim 5 wherein said standing tree-formed projections are formed in such a state that the branches of the respective standing tree-formed projections are opposed at both sides and the end portions of the branches opposed to the inner periphery of the ring, and the narrow slots are formed between the branches of the respective standing tree-formed projections.

8. The pen point as claimed in claim 5, wherein said standing tree-formed projections are formed in such a state that the branches of the standing tree-formed projections, which are mutually in the adjacent relation, are engaged at the sides.

9. The pen point as claimed in claim 1 wherein the narrow slots formed in the inside of the ring are defined by the standing tree-formed projections constituted with at least 3 trunks and not more than 8 of branches branched and projected from one side of each trunk, and the stems the number of which is by 1 less than the number of the branches.

10. The pen point as claimed in claim 9, said standing tree-formed projections are formed in such a state that the side of the trunk and the side of the branches of the standing tree-formed projections, which are mutually in the adjacent relation, are opposed, the end portion of the branches and the inner periphery of the ring are opposed and the side of the branches and the side of the stems are engaged.

11. The pen point as claimed in claim 1 wherein the narrow slots formed in the inside of the ring are defined by the standing tree formed projections constituted with at least 2 trunks and not more than 16 of branches branched and projected from one side of each trunk, and the stems of the same number as or more than the number of said trunks.

12. The pen point as claimed in claim 11, wherein said standing tree-formed projections are formed in such a state that the trunks of said projections and the same number of stems as the trunks are mutually in the adjacent relation and the end portion of the branches of the trunk opposes to the side of the stem and narrow slots are formed between the branches of the respective standing tree-formed projections.

13. The pen point as claimed in claim 11, said standing tree-formed projections are formed in such a state that the branches of the standing tree-formed projections, which are mutually in the adjacent relation, are engaged in the side and there are one or more stems between the sides of the standing tree-formed projections.

14. The pen point as claimed in claim 1, wherein the narrow slots formed in the inside of the ring are defined by the standing tree-formed projections constituted with at least 2 trunks and not more than 16 of branches branched and projected from both sides of each trunk, and the stems, the number of which is by 2 less than the number of the branches.

15. The pen point as claimed in claim 14, wherein said standing tree-formed projections are formed in such a state that the branches of said projections which are mutually in the adjacent relation, are opposed in the side and the side of the branches and the side of the stems are engaged.

16. The pen point as claimed in claim 1, wherein the trunks consist of hollow trunks, each of said hollow trunks being formed by cross-linking a pair of trunks which are projected from the ring at a moderate distance, at the top portion.

17. [The pen point as claimed in claim 1,] *In pen point for writing instruments which is a rod-shaped wick formed by uniting molten synthetic resin monofilaments, wherein radially curved narrow slots extend toward the center of the wick from an outer periphery portion (ring portion) in the cross-section and the radial narrow slots are defined by a plurality of segments projected from the ring portion, an improvement comprises that the rod-shaped wick is provided in the cross-section with curved narrow slots extending not only in the substantially radial direction toward the center from the inside of the ring portion but also in the other directions,*

*said narrow slots are defined by the components of the pen point consisting of the ring portion forming the outer periphery of the rod-shaped wick, a plurality of trunk portions or trunk portions and stem segments which are projected inwardly from the inner periphery of the ring and partition the inner space of the ring and a plurality of branch portions, which are branched and projected from every trunk and additionally partition the remainder of the above described space,*

*said components of the trunks, the trunks and stems and branches are adjacently arranged so that the end portions and the sides of these components are not connected with one another and that these components constitute 2–6 fold axis symmetry wherein the center axis of the ring is the rotary axis,*

*every component of the ring, the trunks, the stems and the branches has at least one size and shape,*

*every trunk provided with branches form at least one of standing tree-formed projections in the inside of the ring,*

*the trunks or the stems of the number corresponding to the fold number of the above described fold axis symmetry are opposed at the center portion,*

*every side of the narrow slots is formed by connection of circular arcs of a large number of monofilaments, which constitute the elementary components*

*the narrow slots extend from one end to the other end of the pen point, and* wherein the trunks or stems of the number corresponding to the fold number of the fold axis symmetry are united at the top portions thereof through the circumstance of a monofilament arranged at the center axis of the ring.

18. The pen point as claimed in claim 1, wherein the ring is triangular, tetragonal, pentagonal, hexagonal or circular.

19. The pen point as claimed in claim 1, the trunks or stems have at least one different height and the height of the trunks is fundamentally different from that of the stems.

20. The pen point as claimed in claim 1, wherein the trunk or stem has straight line-, curve-, wave- or polygonal line- form.

21. The pen point as claimed in claim 1, wherein the branch has straight line-, curve- or L-shaped form.

22. The pen point as claimed in claim 1, wherein the monofilament has a diameter of 0.02–0.30 mm and the monofilaments having different diameter may be combined.

23. The pen point as claimed in claim 1, wherein a width of the narrow slot is 0.02–0.15 mm.

24. The pen point as claimed in claim 1, wherein the monofilament is composed of polyolefin, polyamide or polyacetal resin.

25. The pen point as claimed in claim 1, wherein one end of the pen point has a more elongated tapered end than the writing tip.

26. The pen point as claimed in claim 25, wherein one end of the pen point is provided with a concave portion.

27. Use of the pen point as claimed in claim 26 for an ink supplying element of a water soluble ink ball pen.

28. The pen point as claimed in claim 1, wherein a shoulder portion is provided behind the tapered portion of the writing tip.

29. The pen point as claimed in claim 1, wherein at least one circular groove is provided at an outer circumference of the cylindrical portion between both the ends.

30. The pen point as claimed in claim 1, wherein one end of the pen point is provided with a conical writing tip.

31. Use of the pen point as claimed in claim 30 for a writing instrument.

* * * * *

UNITED STATES PATENT AND TRADEMARK OFFICE

CERTIFICATE OF CORRECTION

PATENT NO. : B1 Re. 30,659

DATED : Certificate Issued January 1, 1985

INVENTOR(S) : Nobuyuki Otake et al.

It is certified that error appears in the above-identified patent and that said Letters Patent is hereby corrected as shown below:

At page 2 of Reexamination Certificate, please insert the following:

--REEXAMINATION CERTIFICATE ISSUED UNDER 35 U.S.C. 307

AS A RESULT OF REEXAMINATION, IT HAS BEEN DETERMINED THAT:

The patentability of claims 1-16, 18-26 and 28-30 is confirmed. Claims 17, 27 and 31 are cancelled.

--.

Signed and Sealed this

*Second* Day of *July 1985*

[SEAL]

*Attest:*

DONALD J. QUIGG

*Attesting Officer* *Acting Commissioner of Patents and Trademarks*

REEXAMINATION CERTIFICATE (292nd)

United States Patent [19]

Otake et al.

[11] B1 Re. 30,659

[45] Certificate Issued Jan. 1, 1985

[54] PEN POINTS FOR WRITING INSTRUMENTS

[75] Inventors: Nobuyuki Otake, Tokyo; Kozo Ando, Chiba; Hironobu Hori, Higashi-Kana; Ykinori Sato, Tokyo, all of Japan

[73] Assignee: Tokyo Boshi Kabushiki Kaisha, Japan

Reexamination Request:

No. 90/000,386, Jun. 1, 1983

Reexamination Certificate for:

| | |
|---|---|
| Patent No.: | **Re. 30,659** |
| Issued: | **Jun. 30, 1981** |
| Appl. No.: | **123,508** |
| Filed: | **Feb. 22, 1980** |

Related U.S. Patent Documents

Reissue of:

| | |
|---|---|
| [64] Patent No.: | **4,076,428** |
| Issued: | **Feb. 28, 1978** |
| Appl. No.: | **684,677** |
| Filed: | **May 10, 1976** |

[30] Foreign Application Priority Data

May 15, 1975 [JP] Japan ..... 50-56693

[51] Int. Cl.[3] ..... B43K 7/00; B43K 1/06

[52] U.S. Cl. ..... 401/209; 401/265; 401/292

[58] Field of Search ..... 401/265, 198, 199, 292, 401/258, 261

[56] References Cited

U.S. PATENT DOCUMENTS

| | | |
|---|---|---|
| 3,203,025 | 8/1965 | Scheur . |
| 3,338,216 | 8/1967 | Roller . |
| 3,361,516 | 1/1968 | Rigondaud . |
| 3,400,998 | 9/1968 | Daugherty . |
| 3,424,539 | 1/1969 | Jenkins . |
| 3,442,739 | 5/1969 | Johnson . |
| 3,464,775 | 9/1969 | Beal . |
| 3,467,478 | 9/1969 | Webber . |
| 3,467,564 | 9/1969 | Daugherty . |
| 3,474,703 | 10/1969 | Davis . |
| 3,480,372 | 11/1969 | Kenny . |
| 3,510,227 | 5/1970 | Horic . |
| 3,518,019 | 6/1970 | Nakamura . |
| 3,520,629 | 7/1970 | Otsuka . |
| 3,538,208 | 11/1970 | Ohtsuka . |
| 3,558,392 | 1/1971 | Goodenow . |
| 3,572,954 | 3/1971 | Cheron . |
| 3,586,454 | 6/1971 | Funahashi . |
| 3,604,817 | 9/1971 | Funahashi . |
| 3,614,247 | 10/1971 | Otsuka . |
| 3,614,248 | 10/1971 | Otsuka . |
| 3,617,325 | 11/1971 | Spokes . |
| 3,623,941 | 11/1971 | Goodenow . |
| 3,627,868 | 12/1971 | Funahashi . |
| 3,666,535 | 5/1972 | Woolley . |
| 3,715,254 | 2/1973 | Tolgyesi . |
| 3,718,401 | 2/1973 | Kiriu . |
| 3,729,270 | 4/1973 | Nakano . |
| 3,778,495 | 12/1973 | Woolley . |
| 3,830,576 | 8/1974 | Kohno . |
| 3,843,270 | 10/1974 | Kiriu . |
| 3,932,044 | 1/1976 | Otake . |
| 3,933,965 | 1/1976 | Gallone . |
| 3,945,869 | 3/1976 | Miller . |
| 3,969,027 | 7/1976 | Randar . |
| 4,072,430 | 2/1978 | Otsuka . |
| 4,310,259 | 1/1982 | Ito . |

FOREIGN PATENT DOCUMENTS

| | | |
|---|---|---|
| 443520 | 5/1970 | Australia . |
| 591686 | 2/1960 | Canada . |
| 839461 | 4/1970 | Canada . |
| 1910268 | 9/1969 | Fed. Rep. of Germany . |
| 1900832 | 3/1970 | Fed. Rep. of Germany . |
| 1561819 | 4/1970 | Fed. Rep. of Germany . |
| 1961975 | 6/1970 | Fed. Rep. of Germany . |
| 1903452 | 8/1970 | Fed. Rep. of Germany . |
| 1959871 | 2/1971 | Fed. Rep. of Germany . |
| 296081 | 1/1972 | Fed. Rep. of Germany . |
| 2110203 | 7/1972 | Fed. Rep. of Germany . |
| 2104054 | 8/1972 | Fed. Rep. of Germany . |
| 1729064 | 5/1973 | Fed. Rep. of Germany . |
| 2225330 | 12/1973 | Fed. Rep. of Germany . |

(List continued on next page.)

OTHER PUBLICATIONS

Publication #2-Unique Nibs-Tokyo Hat, 9/21/71.
Publication #7-Unique Nibs-Tokyo Hat, 10/15/72.
Publication #8-Unique Nibs-Tokyo Hat, 10/15/72.
Publication #9-Unique Nibs-Tokyo Hat, 11/15/72.

(List continued on next page.)

*Primary Examiner*—Stephen C. Pellegrino

[57] ABSTRACT

Pen point for writing instruments which is a rod-shaped wick composed of synthetic resin filaments and in which narrow slots defined by said filaments extend longitudinally in said wick and form ink passageways, comprising in the cross-section (a) a circular portion to form the outer periphery portion of the pen point, (b) a plurality of stem portions projecting inwardly from the inner periphery portion of said circular portion and being arranged at a moderate distance with one another, (c) branches projecting laterally from at least two stem portions, said stem portions and branch portions being constituted with a plurality of connected monofilaments, each having same or different diameter, (d) standing tree-formed projections consisting of said stem portions and said branch portions, which are arranged in a fold axis symmetry against the center of the pen point, and (e) the above described projections being mutually crossed or the above described projections and the above described stem portions are crossed to form narrow slots for conveying ink.

FOREIGN PATENT DOCUMENTS

| | | |
|---|---|---|
| 1261352 | 4/1961 | France . |
| 1325535 | 3/1963 | France . |
| 1485772 | 5/1967 | France . |
| 1527955 | 6/1968 | France . |
| 1588546 | 4/1970 | France . |
| 2101553 | 3/1972 | France . |
| 2182673 | 12/1973 | France . |
| 42-12349 | 7/1967 | Japan . |
| 42-63217 | 4/1968 | Japan . |
| 43-30014 | 12/1968 | Japan . |
| 44-7843 | 3/1969 | Japan . |
| 45-1130 | 1/1970 | Japan . |
| 45-16886 | 7/1970 | Japan . |
| 47-27448 | 7/1972 | Japan . |
| 48-11881 | 3/1973 | Japan . |
| 48-73037 | 9/1973 | Japan . |
| 48-73038 | 9/1973 | Japan . |
| 48-36841 | 11/1973 | Japan . |
| 48-36842 | 11/1973 | Japan . |
| 48-36843 | 11/1973 | Japan . |
| 49-2132 | 1/1974 | Japan . |
| 49-20421 | 5/1974 | Japan . |
| 49-20424 | 5/1974 | Japan . |
| 49-20425 | 5/1974 | Japan . |
| 49-20427 | 5/1974 | Japan . |
| 49-20428 | 5/1974 | Japan . |
| 49-20431 | 5/1974 | Japan . |
| 49-20432 | 5/1974 | Japan . |
| 49-37315 | 10/1974 | Japan . |
| 480196 | 12/1969 | Switzerland . |
| 545203 | 1/1974 | Switzerland . |
| 816877 | 7/1959 | United Kingdom . |
| 843179 | 8/1960 | United Kingdom . |
| 947183 | 1/1964 | United Kingdom . |
| 1163669 | 9/1969 | United Kingdom . |
| 1170018 | 11/1969 | United Kingdom . |
| 1198016 | 7/1970 | United Kingdom . |
| 1202347 | 8/1970 | United Kingdom . |
| 1231956 | 5/1971 | United Kingdom . |
| 1317312 | 5/1973 | United Kingdom . |
| 1351715 | 5/1974 | United Kingdom . |
| 294305 | 3/1971 | U.S.S.R. . |

OTHER PUBLICATIONS

Publication #23–Unique Nibs–Tokyo Hat, 1/16/74.
Publication #23add–Unique Nibs–Tokyo Hat, 8/15/74.
Publication #24–Unique Nibs–Tokyo Hat, 4/15/75.
Pilot Times, vol. 43, No. 2–Pilot, 3/1970.

REEXAMINATION CERTIFICATE ISSUED UNDER 35 U.S.C. 307

THE PATENT IS HEREBY AMENDED AS INDICATED BELOW:

Matter enclosed in heavy brackets [ ] appeared in the reissue patent, but has been deleted and is no longer a part of the reissue patent; matter printed in italics indicates additions made to the reissue patent.

AS A RESULT OF REEXAMINATION, IT HAS BEEN DETERMINED THAT:

The patentability of claims 1–16, 18–26 and 28–30 is confirmed.

Claims 17, 27 and 31 are cancelled.

* * * * *